United States Patent
Tamminga

(10) Patent No.: US 6,890,092 B2
(45) Date of Patent: May 10, 2005

(54) ADJUSTABLE WHEEL SYSTEM FOR A VERTICAL MIXER

(75) Inventor: Jacob R. Tamminga, Orton (CA)

(73) Assignee: Jay-Lor International Inc., Orton (CA)

( * ) Notice: Subject to any disclaimer, the term of this patent is extended or adjusted under 35 U.S.C. 154(b) by 118 days.

(21) Appl. No.: 10/621,342

(22) Filed: Jul. 18, 2003

(65) Prior Publication Data

US 2004/0013035 A1 Jan. 22, 2004

Related U.S. Application Data

(60) Provisional application No. 60/396,565, filed on Jul. 18, 2002.

(51) Int. Cl.$^7$ .............................. B01F 7/24; B02C 18/08
(52) U.S. Cl. ..................... 366/314; 366/348; 366/349; 366/603; 241/46.17; 241/46.017; 241/101.761
(58) Field of Search ................................. 366/314, 266, 366/603, 348, 349, 241; 241/46.17, 46.017, 101.71, 101.761; 280/124.116, 124.111

(56) References Cited

U.S. PATENT DOCUMENTS

| | | | | |
|---|---|---|---|---|
| 4,413,789 A | * | 11/1983 | Rienecker et al. | 241/46.17 |
| 4,535,943 A | * | 8/1985 | Couture | 241/46.17 |
| 4,607,802 A | * | 8/1986 | Lamort | 241/46.017 |
| 4,725,007 A | * | 2/1988 | Chupka | 241/46.17 |
| 4,949,916 A | * | 8/1990 | Wroblewski | 241/152.1 |
| 5,082,188 A | * | 1/1992 | Urich | 241/101.761 |
| 5,139,314 A | * | 8/1992 | Deckler | 280/124.111 |
| 5,553,938 A | * | 9/1996 | Faccia | 366/314 |
| 5,615,839 A | * | 4/1997 | Hartwig | 241/260.1 |
| 5,772,131 A | * | 6/1998 | Dal Maso | 241/46.17 |
| 5,863,122 A | * | 1/1999 | Tamminga | 366/314 |
| 6,328,465 B1 | * | 12/2001 | Tamminga | 366/314 |
| 6,409,376 B1 | * | 6/2002 | Knight | 366/314 |
| 6,409,377 B1 | * | 6/2002 | Van Der Plas | 366/314 |
| 6,467,945 B1 | * | 10/2002 | Albright et al. | 366/314 |

* cited by examiner

*Primary Examiner*—Tony G. Soohoo

(57) ABSTRACT

A vertical mixer has a set of wheels on each side of the mixer that is automatically adjustable for variation in the terrain where the mixer is used. Each set is rotatable about a pivot point. Preferably, weight bars provide the pivot point for each set of wheels. There is a further weight bar in the tongue of the mixer. The weight bars automatically determine the weight of materials within the mixer on an intermittent or continuous basis.

23 Claims, 18 Drawing Sheets

ADJUSTABLE WHEEL SYSTEM FOR A VERTICAL MIXER

This invention claims priority based on U.S. Provisional Application Ser. No. 60/396,565 filed Jul. 18, 2002 and incorporates all of said provisional application by reference.

BACKGROUND OF THE INVENTION

1. Field of Invention

This invention relates to a vertical mixer where there are at least two wheels on each side of the mixer, the wheels being automatically adjustable to cushion the effect of variations in a supporting surface. More particularly, this invention relates to a vertical feed mixer for mixing animal feed and, in particular, for use in mixing hay in any form, including round bales, with other animal feed.

2. Description of the Prior Art

Vertical feed mixers of various forms are known and, in particular, vertical feed mixers for mixing round bales of hay or haylage of any size, including large and small bales with other animal feed stuffs including corn, silage, commodities, by-products and concentrates are known. The feed mixers are often used in a field or other location where the terrain is uneven. For proper mixing, it can be important to have the mixer in a vertical position or as close to vertical as reasonably possible. It can also be important to have the mixer mounted in a stable position on the supporting surface. In previous mixers, the weight of materials being mixed is sometimes not known or is not determinable on a continuous basis.

SUMMARY OF THE INVENTION

It is an object of the present invention to provide a vertical mixer with two or more wheels on each side of the mixer, the wheels being automatically adjustable relative to one another to cushion variations in the terrain. It is a further object of the present invention to provide a vertical mixer where the weight of materials within the mixer at any given time can be displayed on a continuous basis.

A vertical mixer comprises a mixing chamber containing a substantially vertical rotatable auger having a generally helical flight that is tapered to converge from bottom to top. The flight has a periphery, with power means to rotate the auger about a longitudinal centre axis. The chamber has at least one opening to receive and discharge materials to be mixed. The chamber has an underside with two sets of wheels thereon, there being one set of wheels at each side of the mixer. Each set of wheels has at least two wheels therein, the at least two wheels being mounted so that the at least two wheels are adjustable relative to said chamber to cushion variations in the terrain supporting the mixer.

DETAILED DESCRIPTION OF A PREFERRED EMBODIMENT

Figure 1:
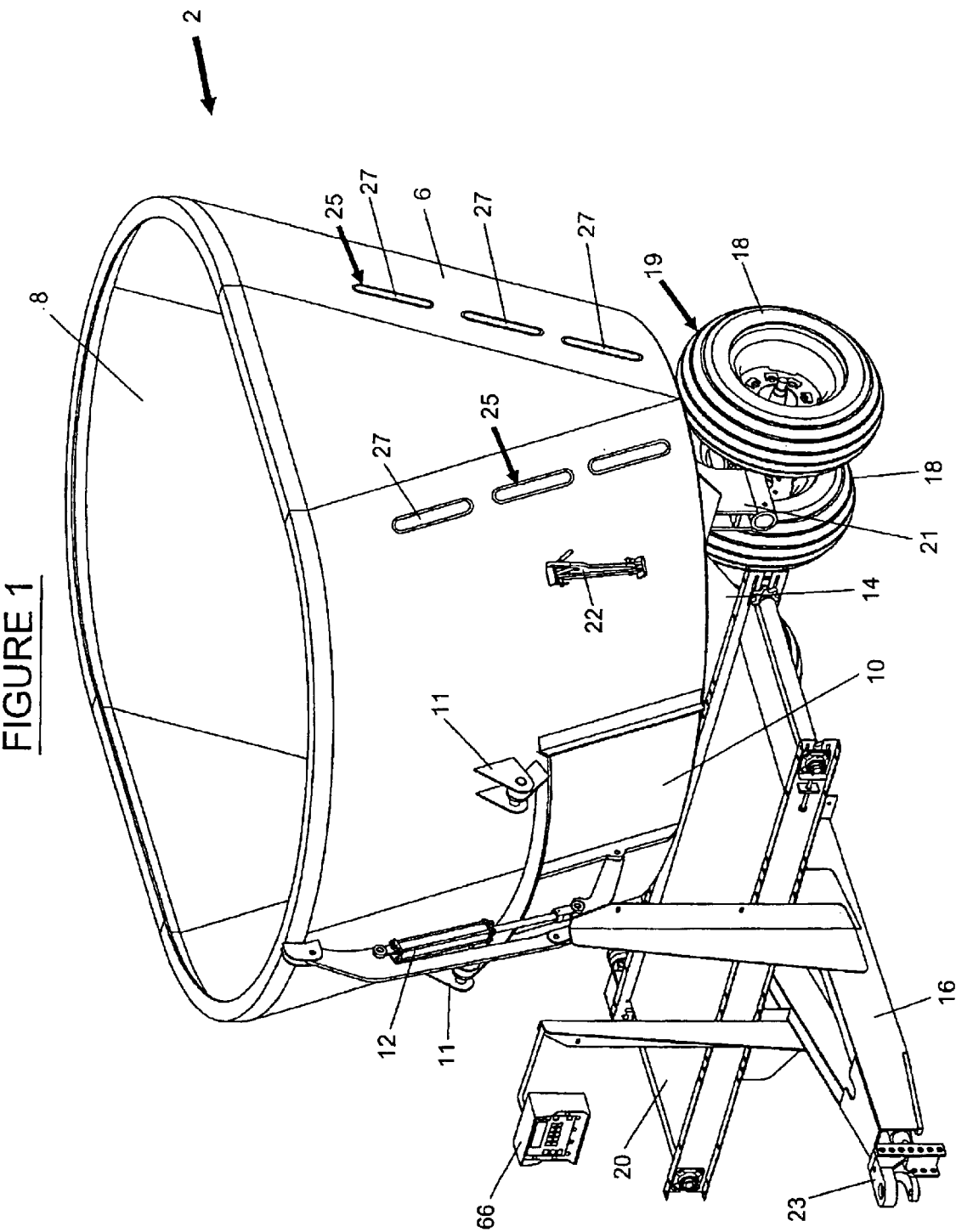
FIG. 1 is a perspective view of a single auger vertical mixer.
Figure 2:
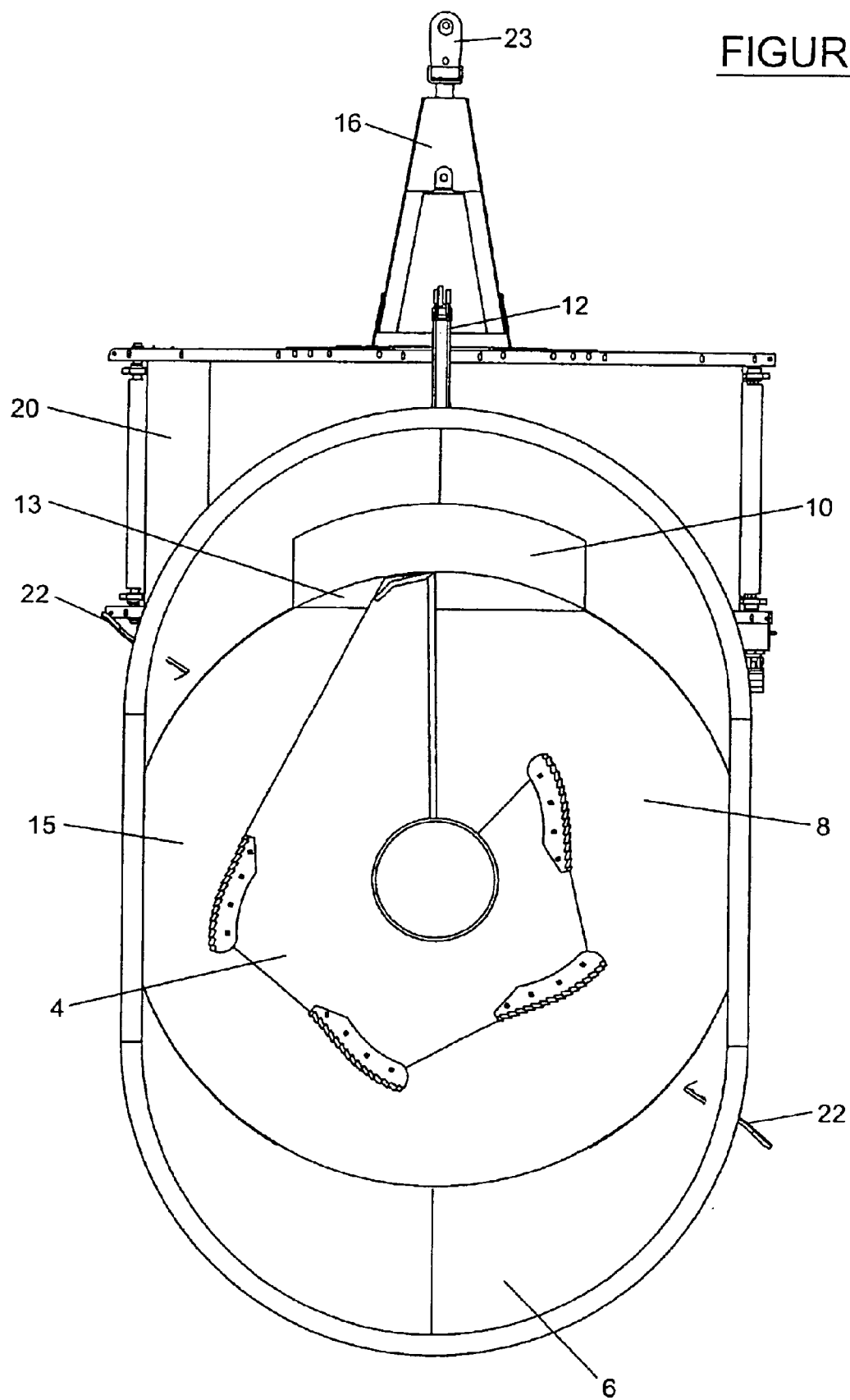
FIG. 2 is a top view of a single auger vertical mixer.

In FIGS. 1 and 2, there is shown a mixer 2 having a single auger 4 with a tapered wall 6 of a mixing chamber 8. The tapered wall 6 converges from top to bottom. The chamber 8 has an open top and an outlet door 10 that is in a closed position. The door 10 is connected by hinges 11 and is operable between said closed position and an open position (not shown) by means of a hydraulic cylinder 12. The door can be designed to be opened and closed in various ways. The door has a segment 13 along a bottom thereof that forms part of a floor 15 of the mixing chamber 8 when the door is in the closed position. The mixer 2 has a frame 14 with a tongue 16 and wheels 18. There are two sets 19 of wheels 18 mounted on each side of the mixer 2 (only one set 19 being shown in FIG. 1). Each set 19 has two wheels 18. Each set 19 is affixed to the mixer by a bracket 21. A conveyer 20 is used to move mixed material that exits the door 10 away from the mixer 2. An adjustable baffle 22 located in the wall 6 assists in controlling the degree of cutting that occurs within the mixer. There are two baffles 22 shown in the mixer 2. The tongue 16 has a hitch 23 to connect the mixer to a tractor (not shown). There are two groups 25 of windows 27 extending between a top and bottom of the tapered wall 6 of the mixing chamber 8. There are three windows 27 in each group. The location of the windows enables an operator of the mixer to view the degree of mixing within the mixing chamber from outside the mixer. For example, near the beginning of the mixing process, the lowermost window in each group may show the highest degree of mixing, the middle window may show a medium degree of mixing and the upper window may show the least degree of mixing. As the mixing process proceeds, the degree of mixing in the three windows of each group will become substantially uniform. The auger 4 is substantially vertical and is rotated by power means (not shown) about its longitudinal centre axis. A display 66 is described in more detail below.

Preferably, the windows have an elongated shape and extend vertically between the top and bottom of the side wall of the mixing chamber. Preferably, there is more than one window. If one window is used and that one window extends between the top and bottom of the mixing chamber, that one window could reduce the structural integrity of the chamber. By using three windows spaced apart from one another, the strength of the chamber can be maintained more easily as the side wall extends between the windows.

Figure 3:
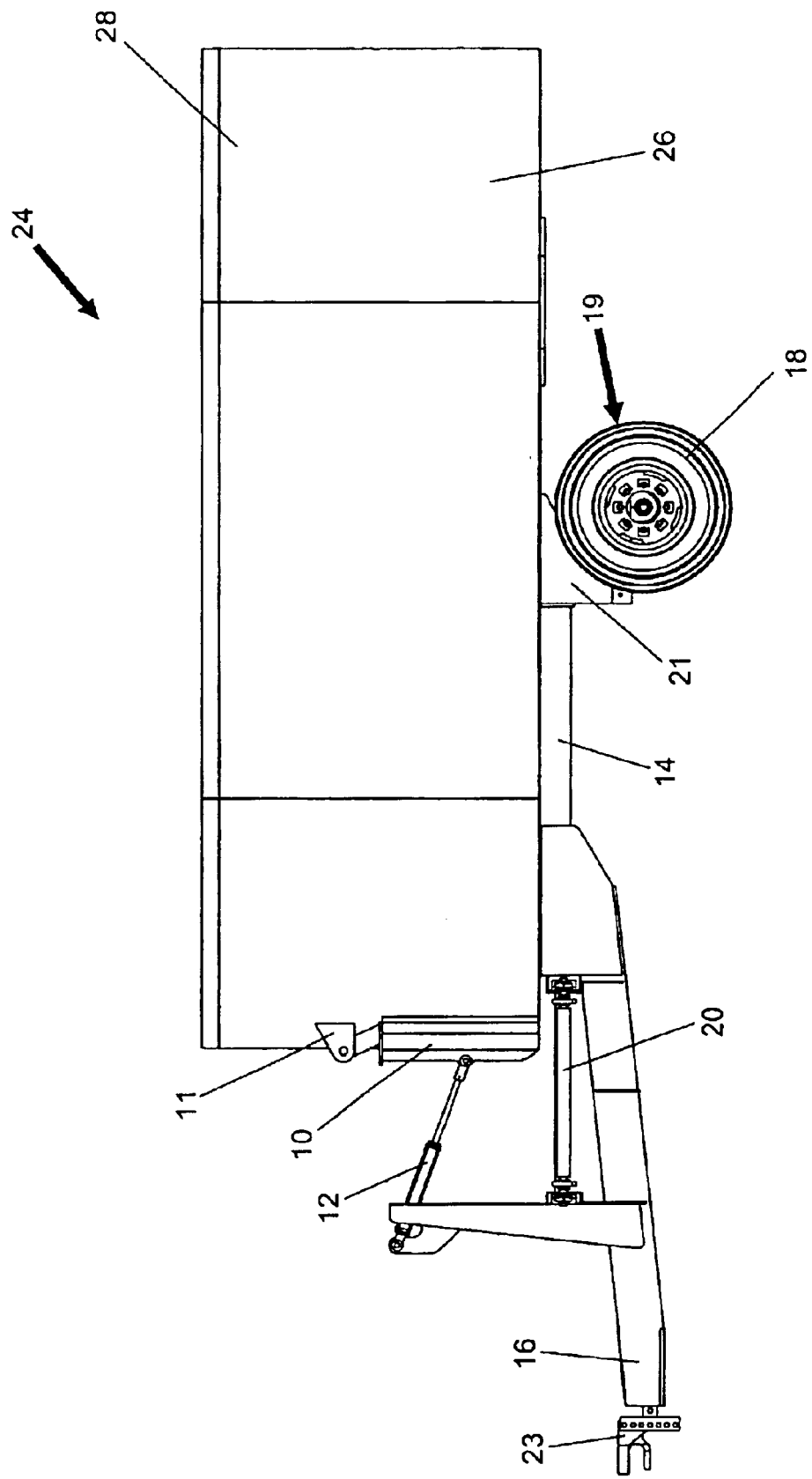
FIG. 3 is a side view of a double auger mixer.
Figure 4:
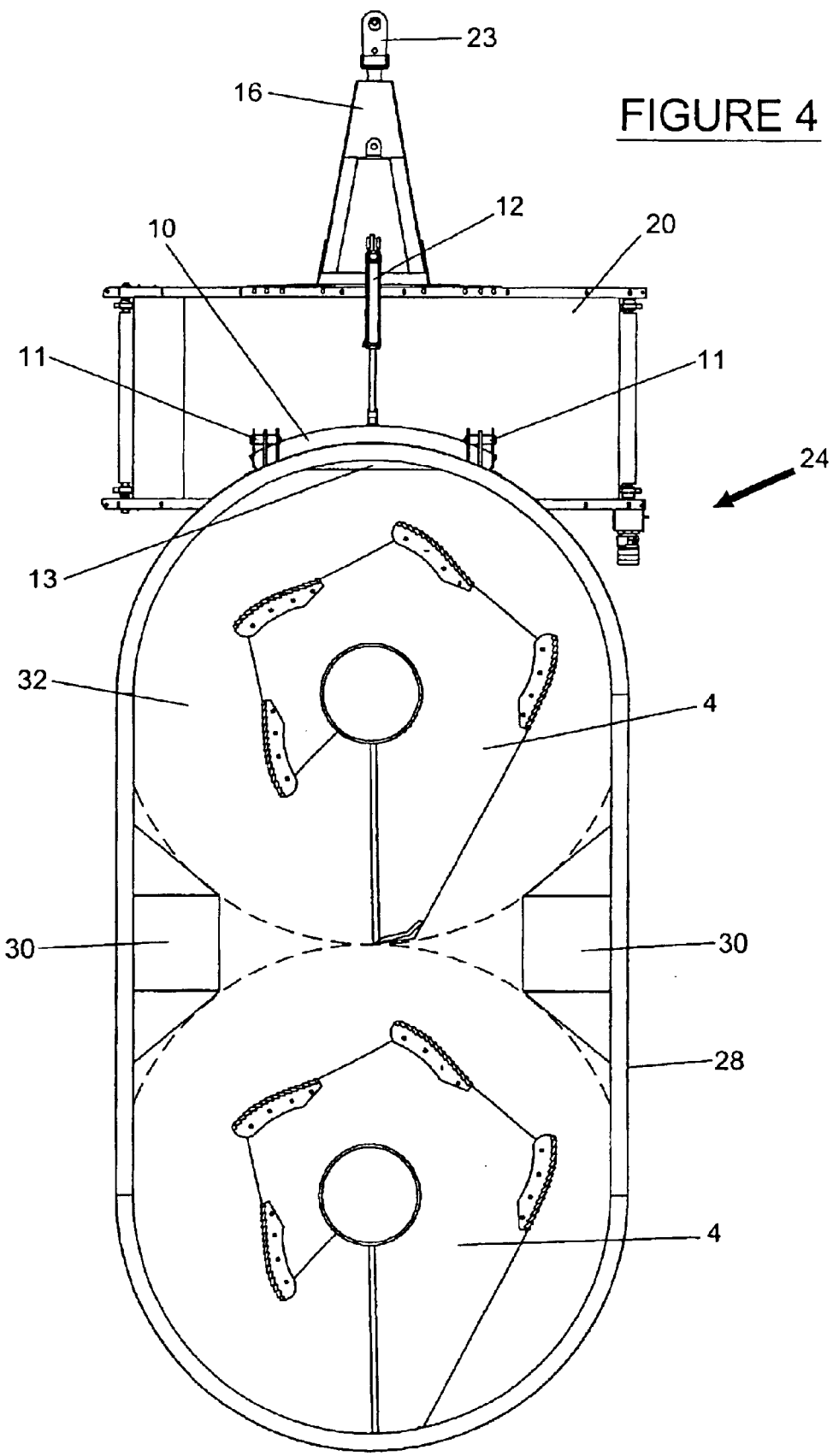
FIG. 4 is a top view of the mixer of FIG. 3.

In FIGS. 3 and 4, a mixer 24 has two augers 4. A side wall 26 of a mixing chamber 28 is vertical. Bulkheads 30 are located within the chamber 28 between the two augers 4. The bulkheads 30 have sloped surfaces and are located in what would otherwise be dead areas of the chamber 28 to prevent materials that are being mixed from coming to rest in the areas where the bulkheads are located. When material strikes the bulkheads 30, the material slides onto a floor 32 of the mixing chamber 28. The mixer 24 has a drive shaft (not shown) that is sized and located to be connected to the power take-off of a tractor (not shown). Those components of FIGS. 3 and 4 that are the same or similar to the components of FIGS. 1 and 2 are described using the same reference numerals as used for FIGS. 1 and 2.

Figure 5:
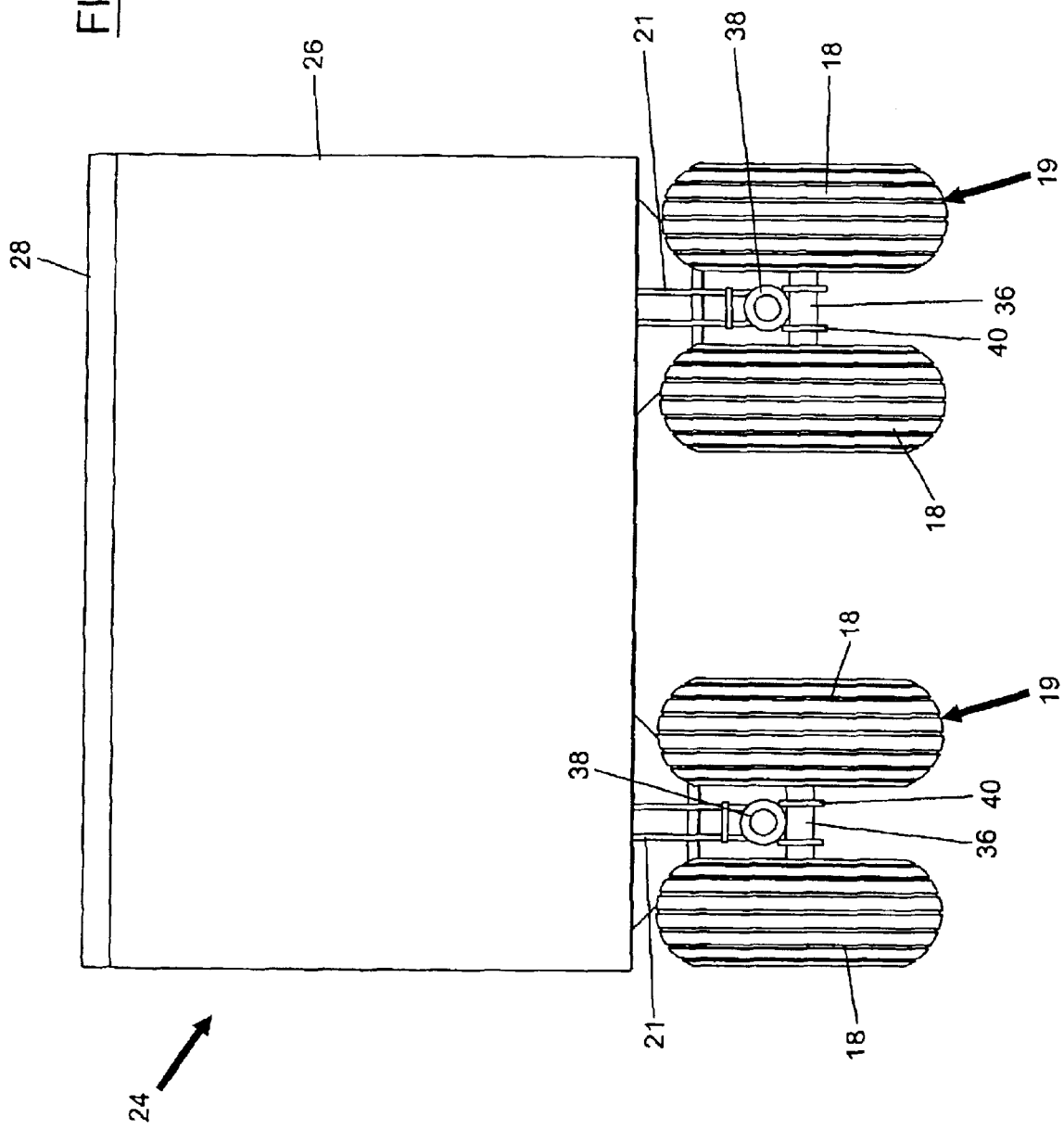
FIG. 5 is an end view of a mixer of FIG. 3.
Figure 6:
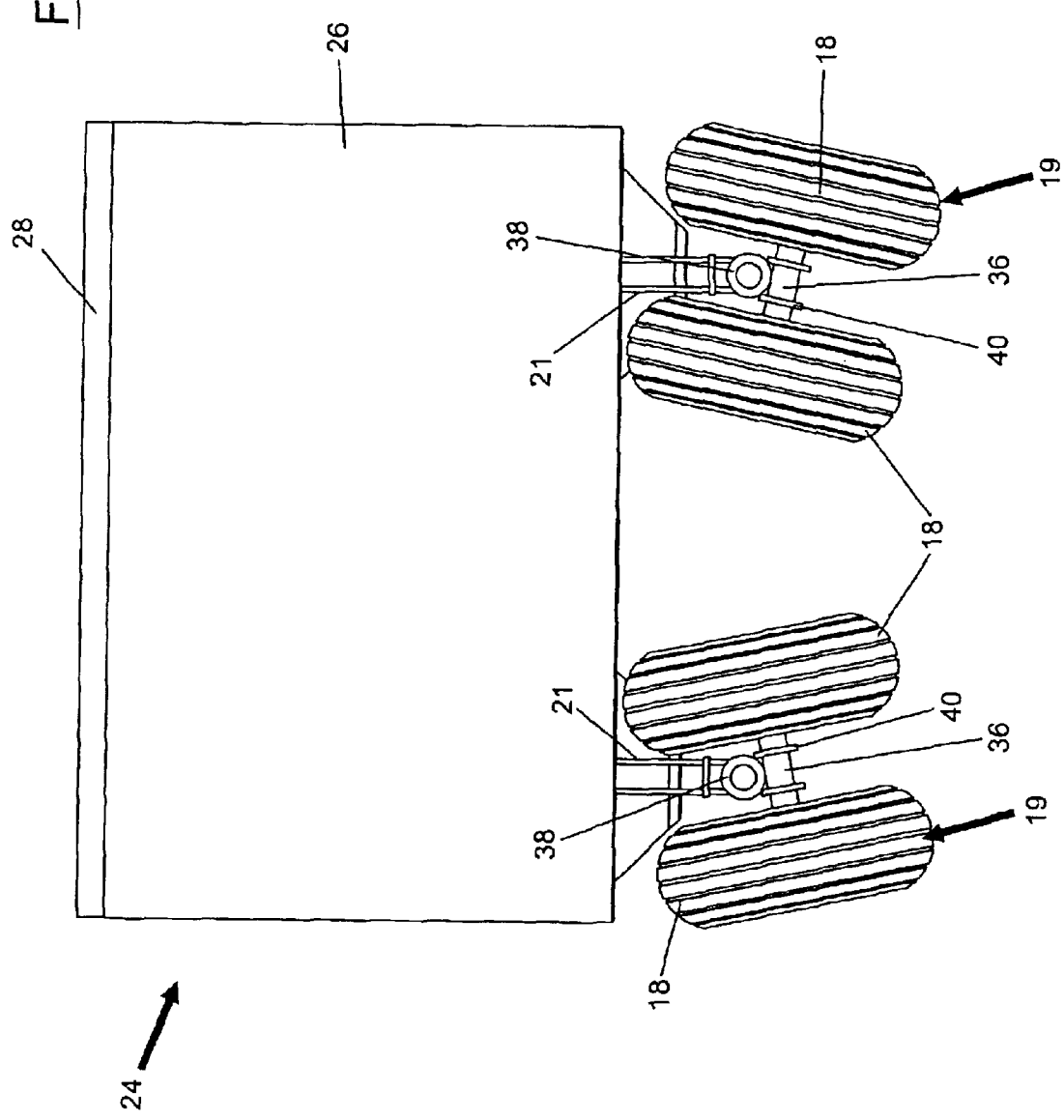
FIG. 6 is an end view of the mixer of FIG. 5 with the wheels tilted.

In FIGS. 5 and 6, there is shown a rear view of the mixer 24. It can be seen that there are two sets 19 of double wheels 18, one set 19 being located on either side of the mixer 24. The identical sets 19 of two wheels 18 are located on either side of the single auger mixer 2, but a rear view of the mixer 2 is not shown in the drawings. A short axle 36 extends between the wheels 18 of each set of 19. The short axle 36 is attached to a weight bar 38 by ring brackets 40. The weight bar 38 is rotatable about its longitudinal axis and provides a pivot point for rotation of each set 19 of wheels 18 as is readily apparent by comparing FIGS. 5 and 6. Since the weight bar 38 is rotatable about its longitudinal axis, the wheels 18 in each set 19 are rotatable about the longitudinal axis of the weight bar 38. The components of FIGS. 5 and 6 that are identical to the components of FIGS. 3 and 4 are described using the same reference numerals. In FIG. 6, it can be seen that the set 19 of wheels 18 on the left hand side is rotated counterclockwise from vertical and the set 19 of wheels 18 on the right hand side is rotated clockwise from vertical.

Figure 7:
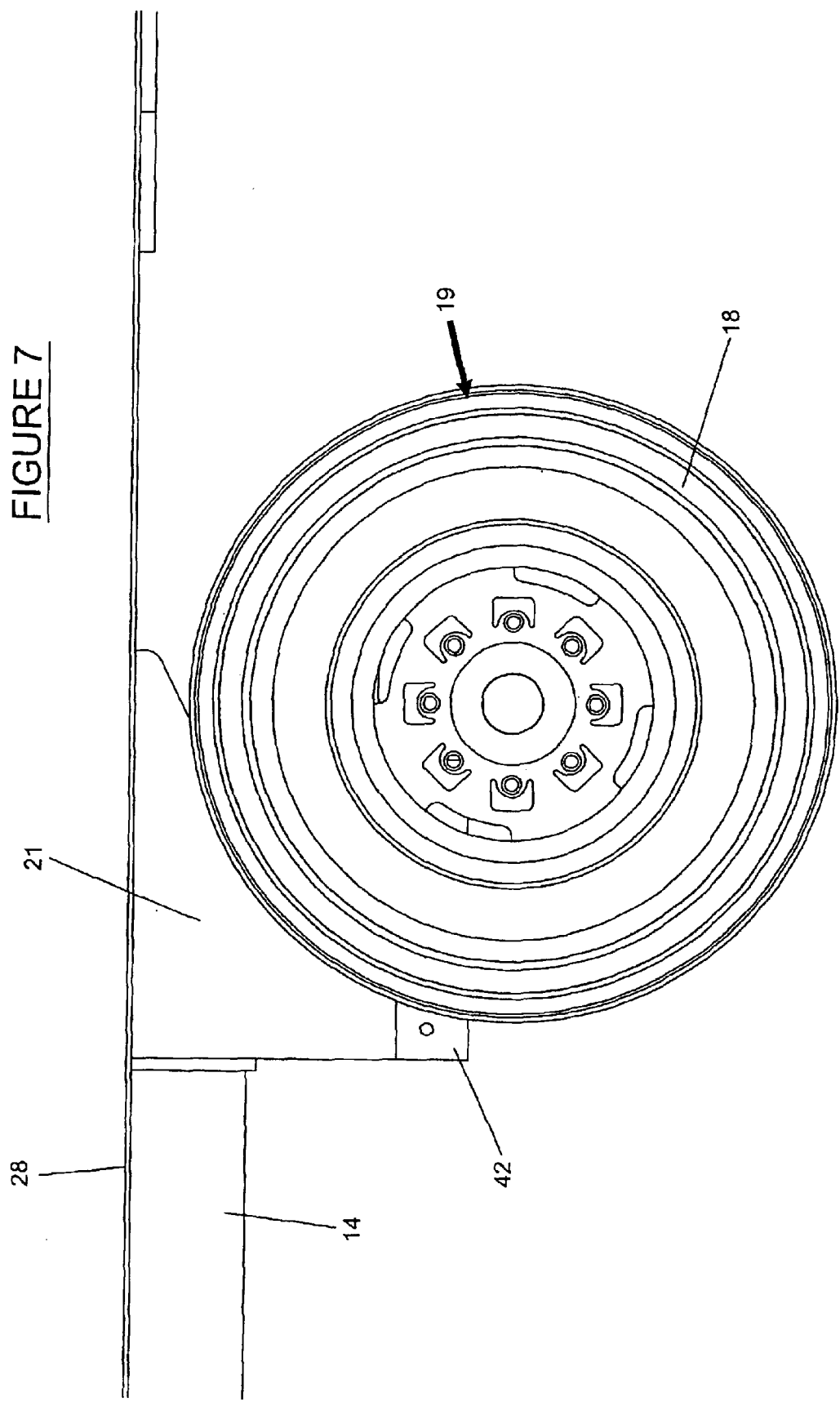
FIG. 7 is an enlarged side view of a wheel and support brackets.
Figure 8:
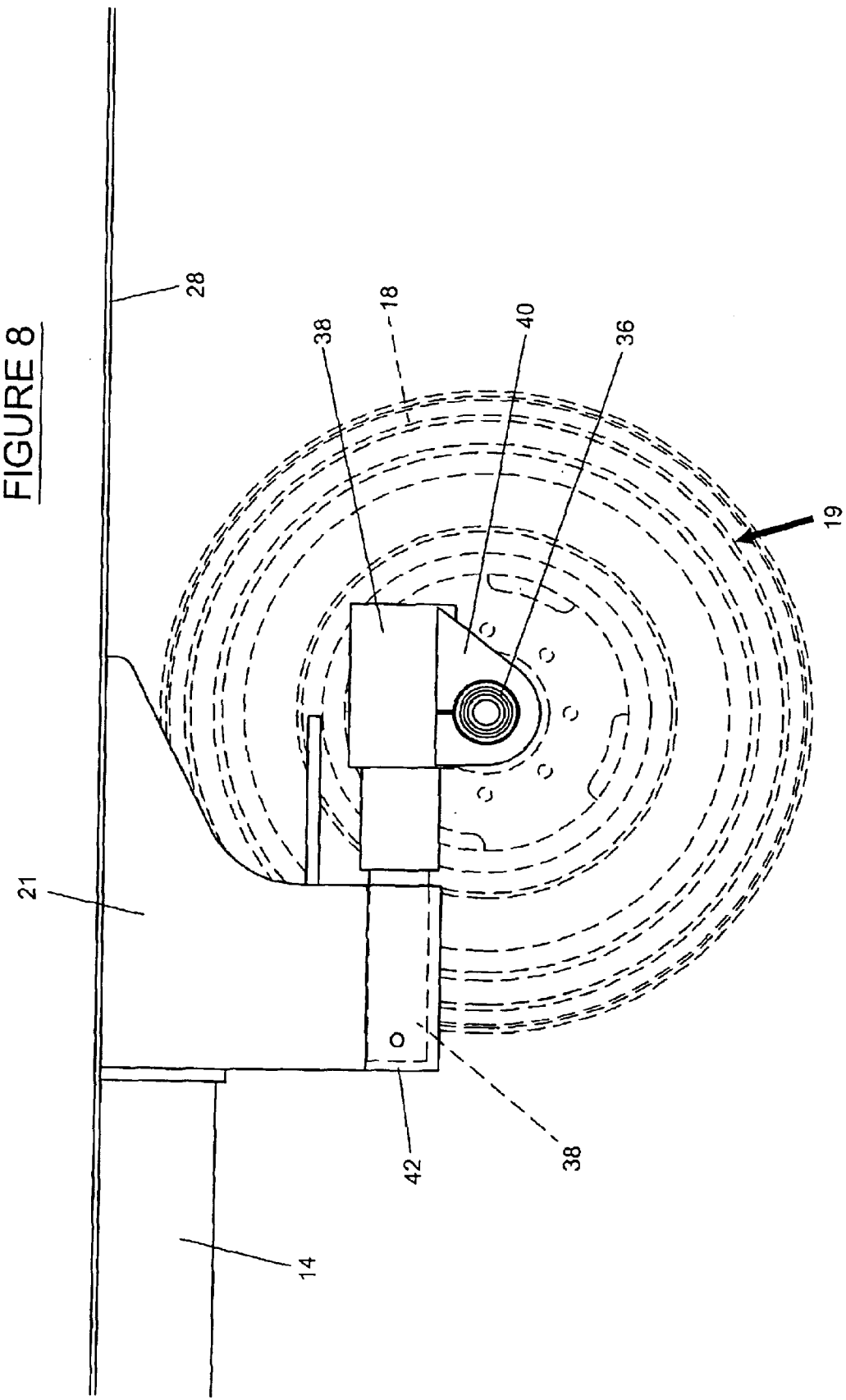
FIG. 8 is a side view of an inner wheel.

In FIG. 7, there is shown an enlarged side view of a set 19 of wheels 18 (only one of which is shown in FIG. 7). In FIG. 8, there is shown an enlarged side view of the inner wheels 18 with an outer wheel removed to expose the weight bar 38 and a sleeve 42. The weight bar 38 is rotatably inserted into the sleeve 42. The sleeve 42 is preferably a scale bar but a metal cylinder could be used in place of the weight bar 38. The sleeve 42 is supported by the bracket 21. Each set of wheels pivots about the cylinder 38. There is a weight bar located at the pivot point for each set 19 of wheels 18. There are two weight bars and two sleeves 42 with one weight bar being mounted within each sleeve. The sleeves are independently rotatable about the weight bar. The sleeve 42 has a cylindrical shape and is mounted to extend horizontally between the two wheels 18 (only one of which is shown). The bracket 21 is preferably affixed to a frame 44 and to an underside of the mixing chamber 28. The wheels 18 (only one of which is shown) are tiltable in a plane normal to the sleeve 42, and in a plane extending laterally through said mixer and parallel to said axle. The same reference numerals are used in FIGS. 7 and 8 to describe those components that are identical to the components in FIGS. 5 and 6.

Figure 9:
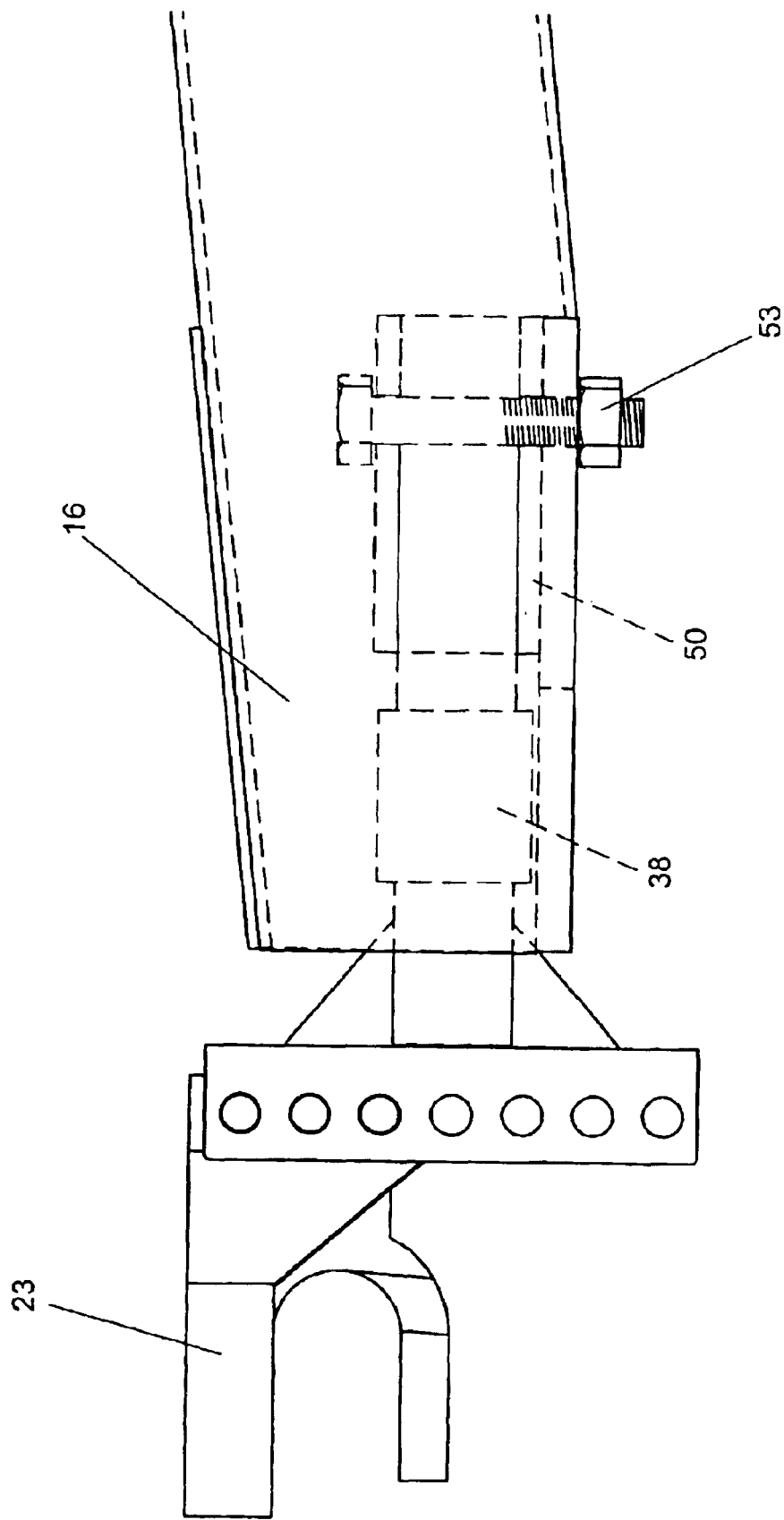
FIG. 9 is a partial side view of a tongue.

In FIG. 9, there is shown a partial side view of a tongue 16. The same reference numerals are used in FIG. 9 as those used in FIG. 4 to describe those components that are identical. The tongue 16 for the mixer 24 shown in FIG. 3 is identical to the tongue 16 of the mixer 2 shown in FIG. 1. The tongue 16 has a hitch 23 with a weight bar 38 (shown by dotted lines) that is mounted within a tube 50 within the tongue 16. The weight bar 38 is held in place within the tongue 16 by bolts 53. The tube 50 of the tongue 16 surrounds the weight bar 38.

Figure 10:
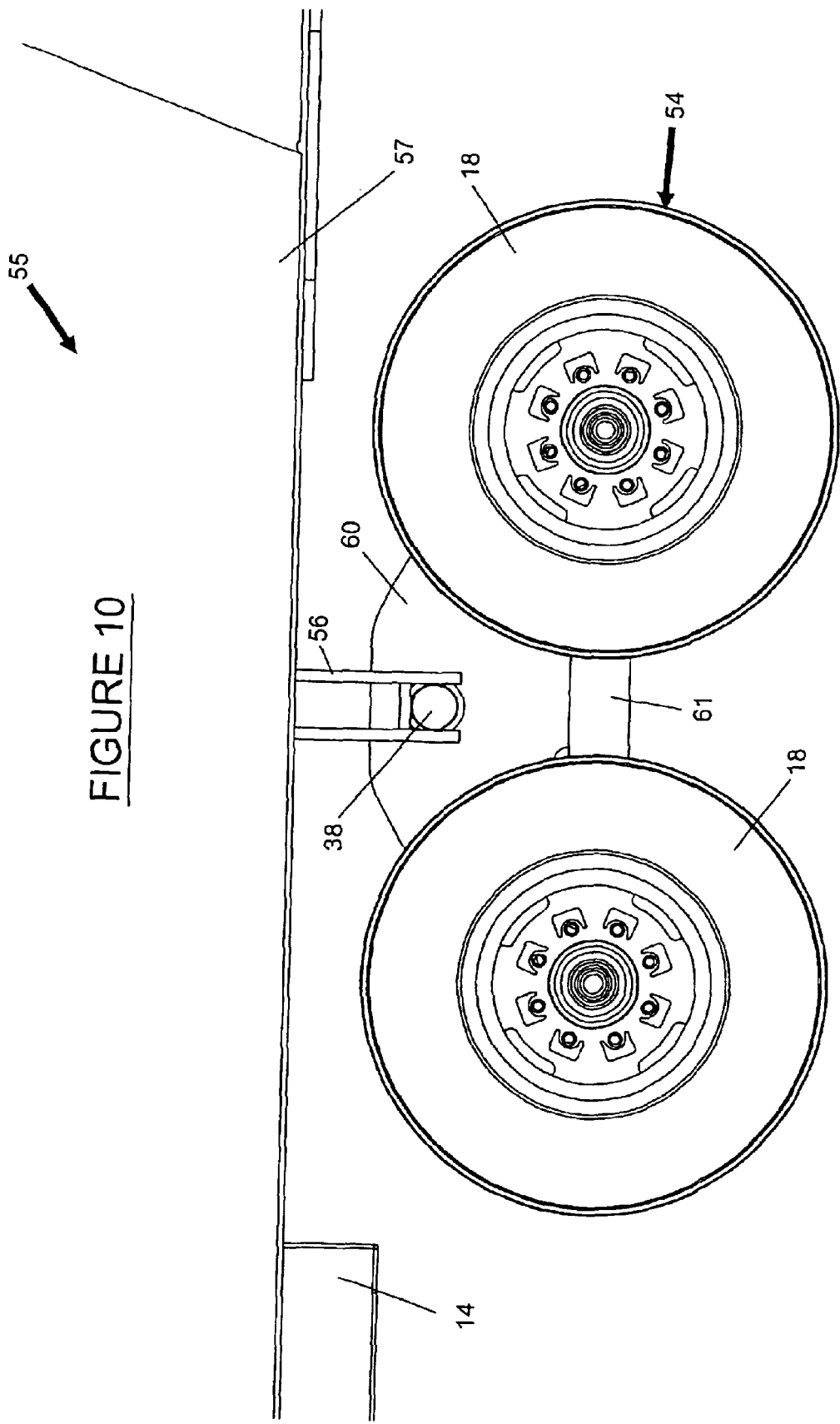
FIG. 10 is an enlarged partial side view of a further embodiment of the wheels on a double auger mixer.
Figure 11:
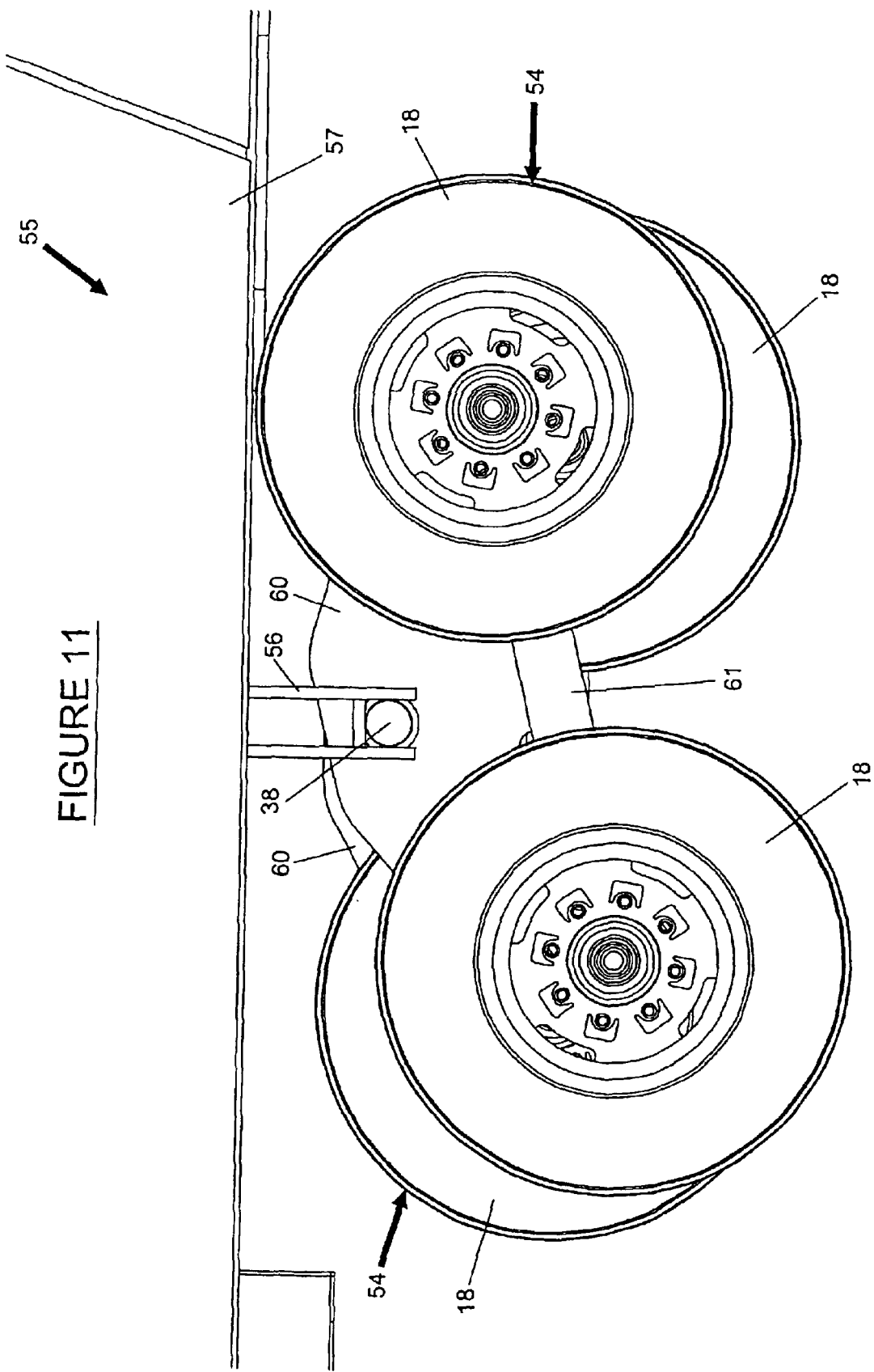
FIG. 11 is an enlarged partial side view of a double auger mixer with one set of wheels tilted.

In FIG. 10, there is shown an enlarged side view of a set 54 of four wheels 18 (only two of which are shown). In FIG. 11, there is shown an enlarged side view of two sets 54 of four wheels 18 (only two wheels of each set being shown), one set being located on each side of a mixer 55. Each set 54 contains four wheels 18 and the sets 54 are used on the double auger mixer 55 as an alternative to the two wheel sets 19. As a further embodiment, a set of wheels could be used with two wheels only mounted in tandem (not shown) rather than the four wheels used in the set 54. Further, the four wheel set or the two wheel tandem set could be used on the single auger mixer 2, or on the double auger mixer 24. In FIG. 11, it can be seen that the set 54 is pivoted with the two front wheels of the set on a near side of the mixer 55 moved downward and the two rear wheels of the same set 54 moved upward. The remaining set 54 on the other side of the mixer 55 remains in a horizontal position. The wheels 18 are allowed to tilt in order to adjust for variations in the terrain over which the mixer is moved.

Figure 12:
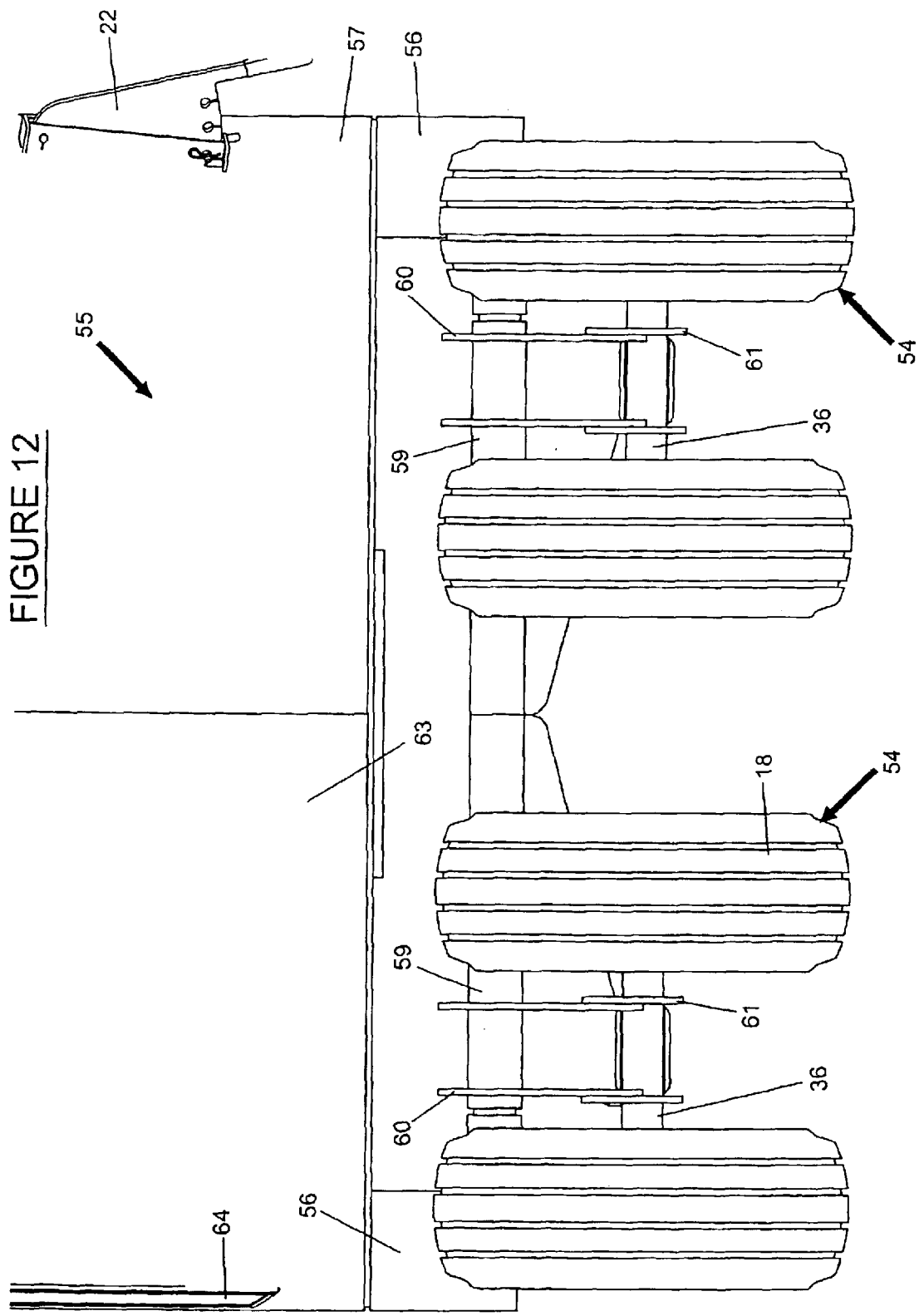
FIG. 12 is a partial end view of the wheels of a mixer.

In FIG. 12, a rear view of each of the sets 54 on the mixer 55 is shown. The axle 36 connects the laterally adjacent wheels 18 on each of the sets 54. Two support brackets 56 are affixed to an underside of the mixing chamber 57 and extend downward from either side of the mixer 55. A pivot bar 58 (not shown in FIG. 12, see FIGS. 13, 15 and 16) is concentrically mounted in two sleeves 59 between the two support brackets 56. A pivot bracket 60 extends from front to rear in each of the sets 54 to connect the two axles 36 with one of the sleeves 59. The pivot bracket 60 has a ring bracket 61. The pivot bracket 60 and the sleeves 59 are designed to pivot relative to the pivot bar. The pivot bracket 60 is welded to the sleeves 59. Weight bars 38, one at each side of the mixer have an outer end supported in the two support brackets 56. An inner end of each weight bar 38 is concentrically mounted in the sleeves 59. The weight bars 38 are located at the pivot points of each set of wheels, there being one weight bar at each pivot point. Each weight bar 38 is located to provide the pivot point for one set of wheels. In other words, each set 54 of wheels pivots about a longitudinal centre axis of the weight bar 38 located on the same side of the mixer. The weight bars 38 are aligned with the pivot bar 58 within the sleeves 59. The pivot points have the same longitudinal axis in this embodiment for both sets 54 of wheels 18, but one pivot point is located at each side of the mixer. With the two wheel sets 19 shown in FIGS. 1 to 18, there is one pivot point on each side of the mixer but the two pivot points have different longitudinal axes. A short axle 36 connects two adjacent wheels 18. A wall 63 of the mixing chamber 57 contains a vertical window 64.

Figure 13:
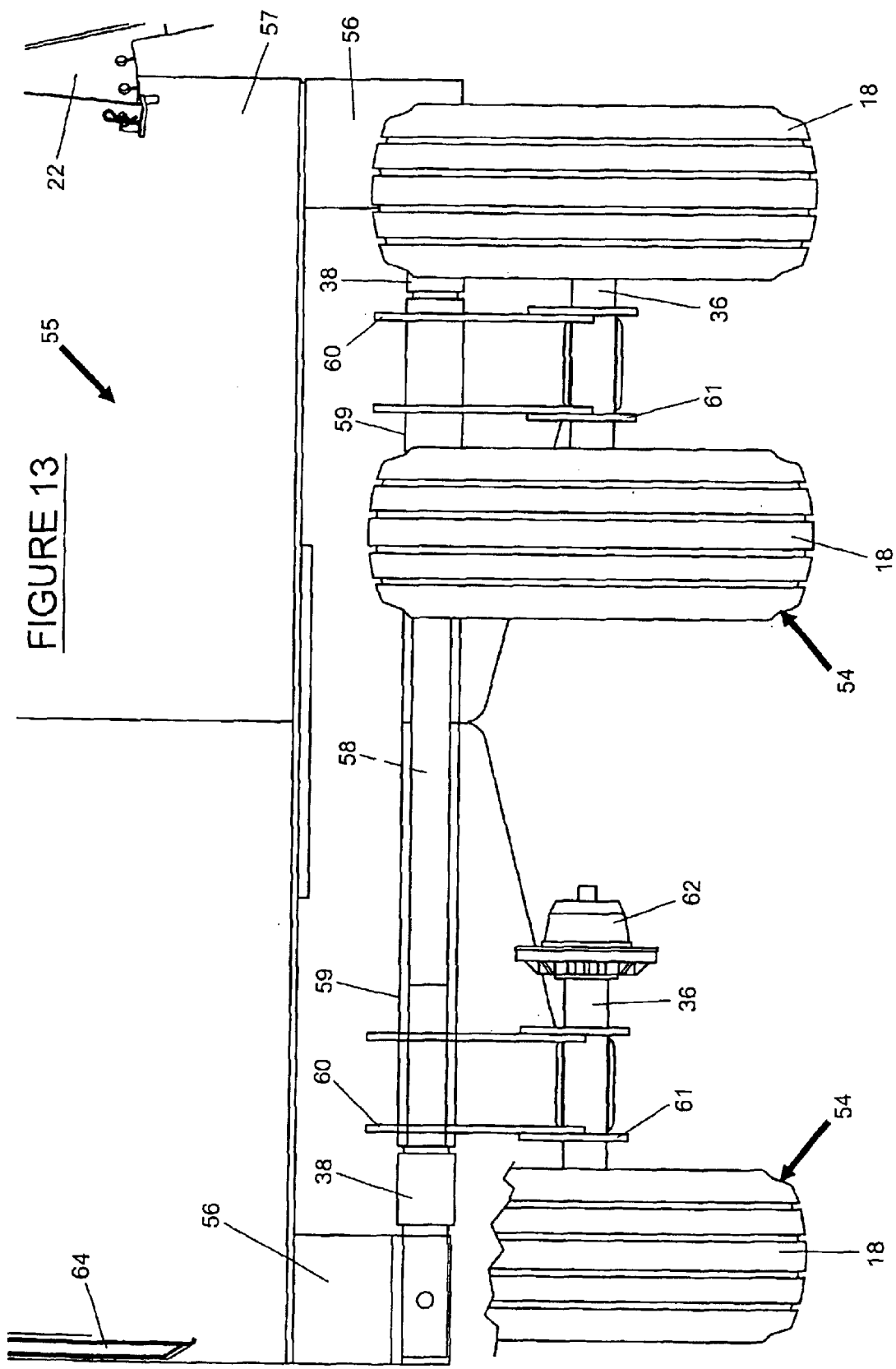
FIG. 13 is a partial end view of the wheels of the mixer with one wheel removed.

In FIG. 13, it can be seen that the pivot bar 58 extends within the sleeves 59 substantially between the two pivot brackets 60 on each side of the mixer 55 to the inner ends of the weight bars 38. The weight bars 38 are mounted within each end of the sleeves 59 and extend beyond the sleeves 59 into the support brackets 56 on either side of the mixer 55. The weight bars are held in place within the brackets 56 by pins (not shown) Since one of the wheels 18 of the set 55 on the left hand side is deleted in FIG. 13, a hub 62 is shown to be mounted on the axle 36. Each of the four wheels 18 for each set is mounted on a hub. The hub 62 rotates relative to the axle 36.

Figure 14:
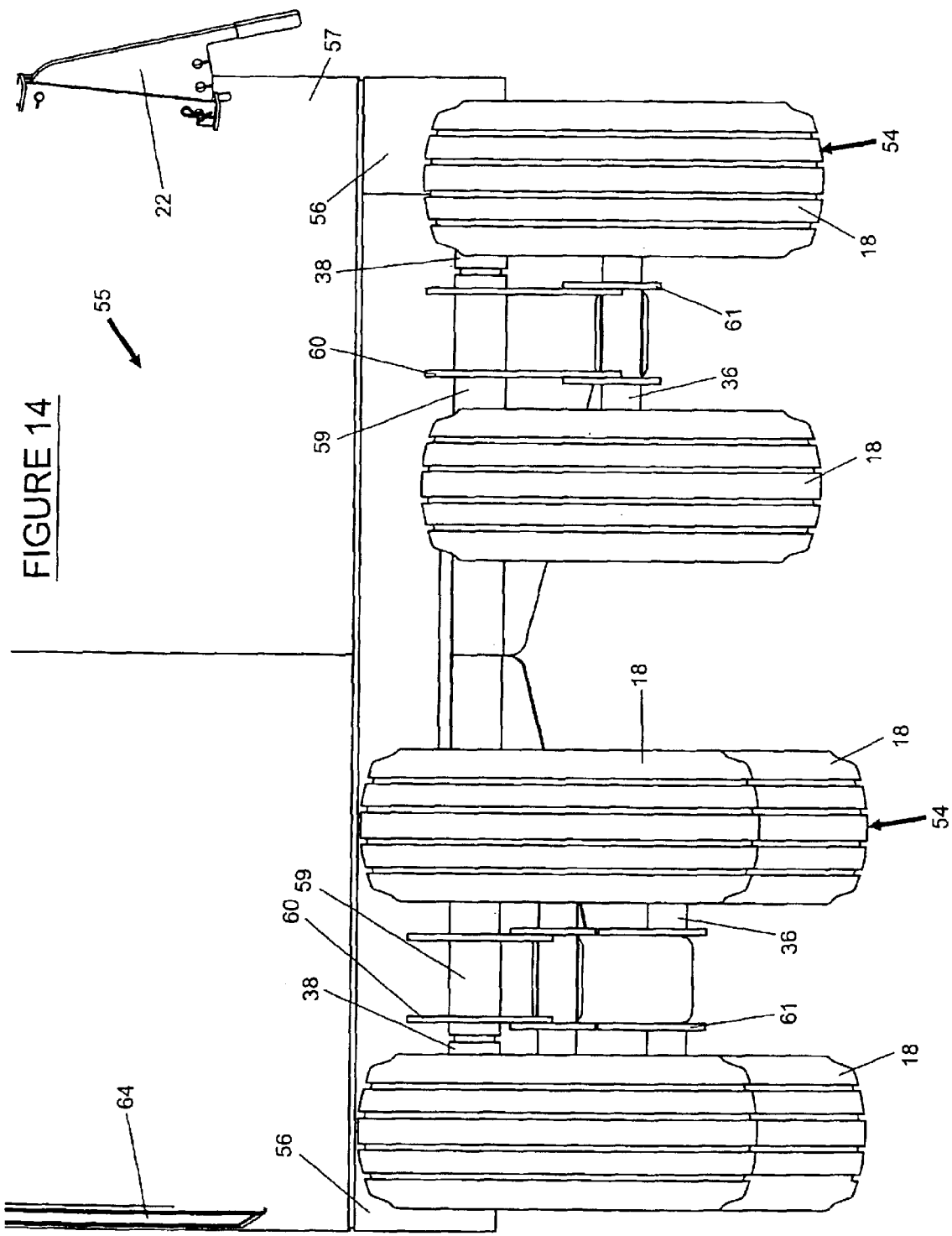
FIG. 14 is a partial end view of a mixer with two wheels on one side adjusted upward relative to the remaining two wheels.

In FIG. 14, there is shown a rear view of the mixer 55 with the set 54 on the left hand side having the two front wheels 18 tilted downward and the two rear wheels 18 tilted upward. The two front wheels are the first and third wheels and the two rear wheels are the second and fourth wheels of the set. The wheels 18 of the set 54 on the right hand side of the mixer are horizontal.

Figure 15:
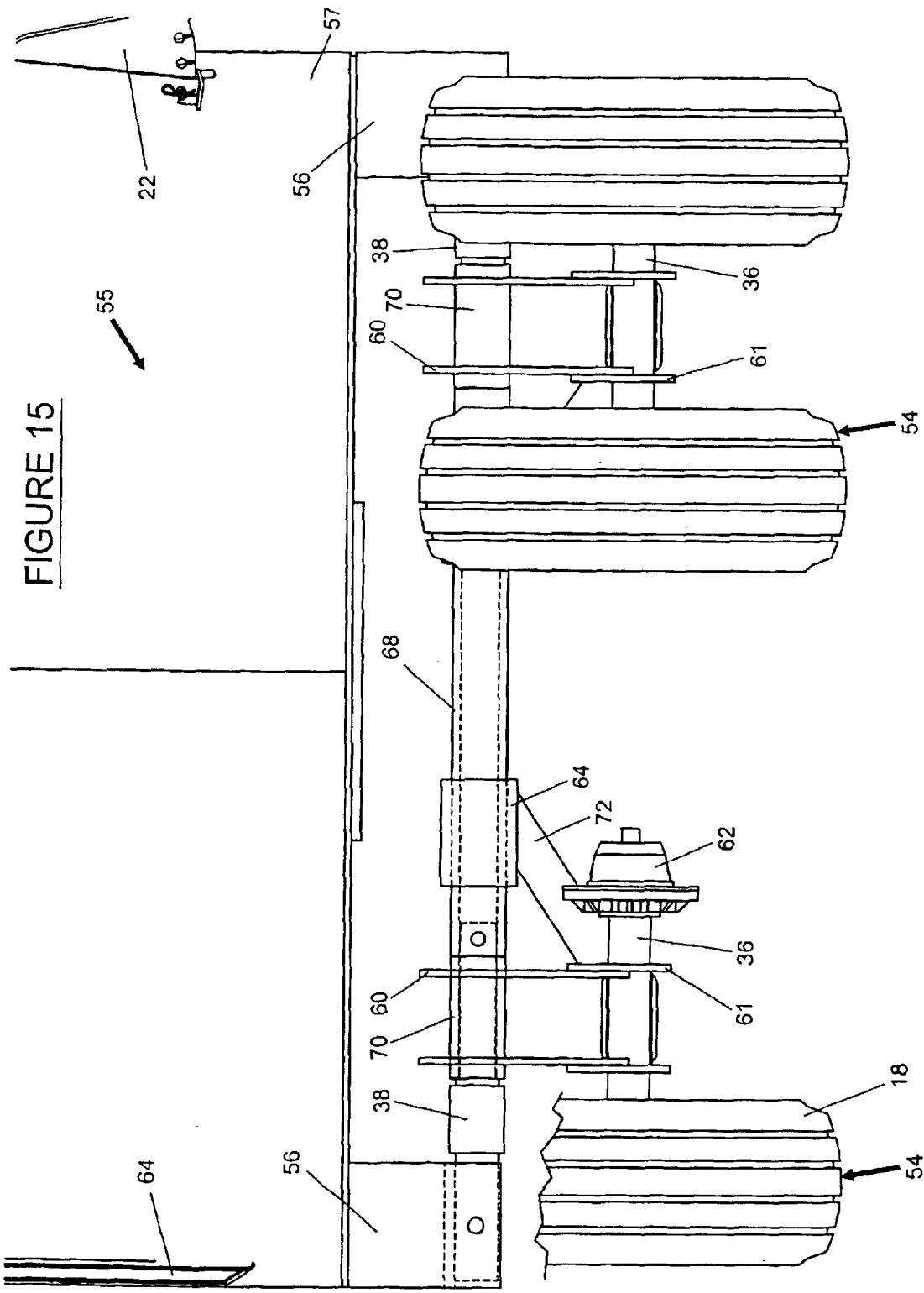
FIG. 15 is a partial end view of a further embodiment of an adjustable axle with two inner wheels removed.

In FIG. 15, there is shown a rear view of the mixer 58 with a different adjustable axel system and the two inner wheels on the left hand set 54 deleted. A central pipe 68 (which can be a solid shaft) extends between the weight bars 38 at either end thereof. Each pivot bracket 60 is affixed to a short sleeve 70 that pivots about the weight bar 38. There are two short sleeves 70. It can be seen that the weight bars 38 each have an opening therein corresponding to an opening in the central pipe 68 to receive a pin (not shown) to connect the weight bars 38 to the pipe 68. An additional sleeve 64 having a brace 72 is mounted on the pivot bar 58 on the left hand side of the central pipe 68. The brace 72 is connected to the pivot bracket 60. The additional sleeve 64 and brace 72 pivot with the pivot bracket 60 and the short sleeve 70 about the weight bar 38. An identical additional sleeve and brace are be located on the right hand side as well, but are generally hidden by the inner wheel.

Figure 16:
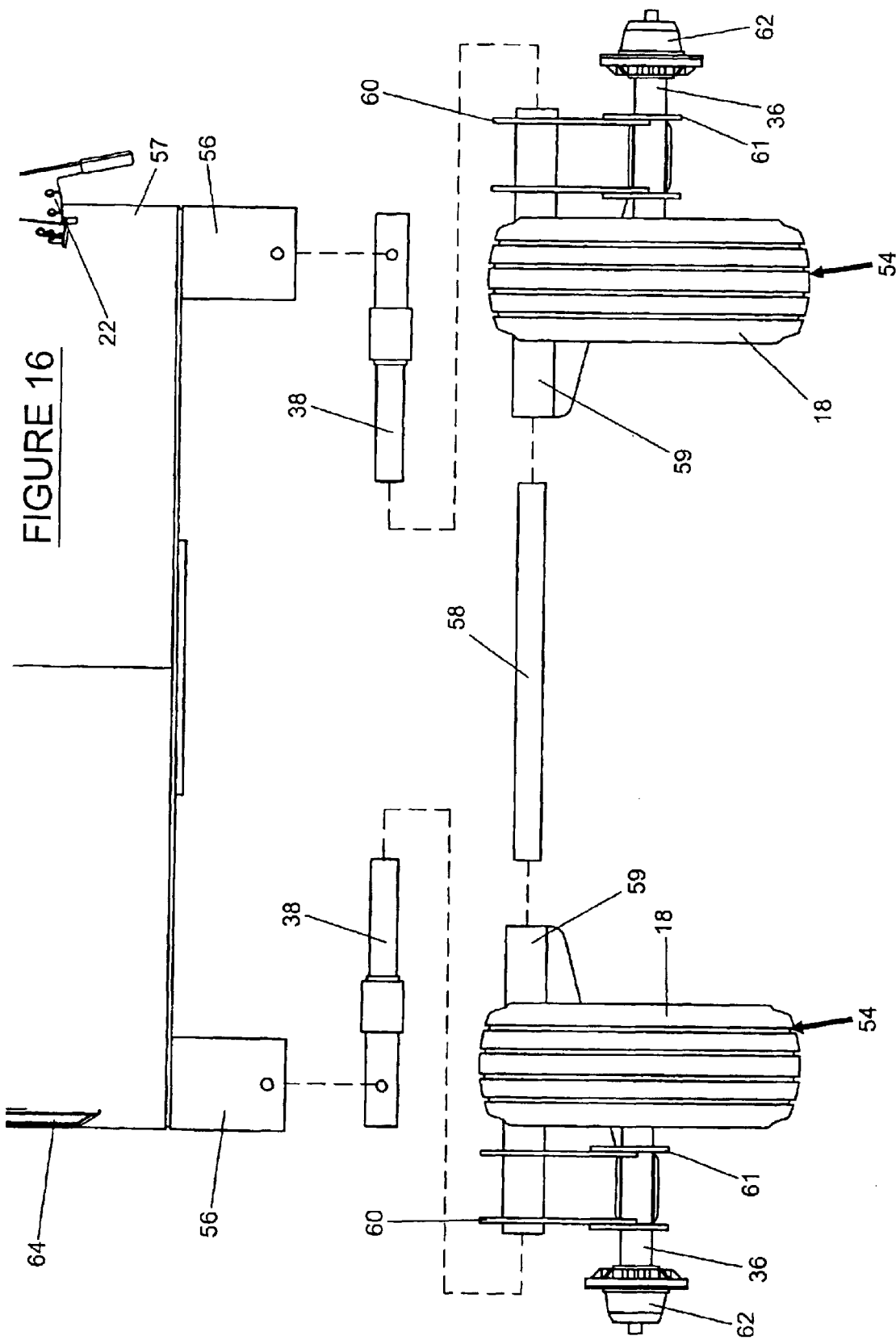
FIG. 16 is an exploded partial end view of the mixer FIG. 14 with the outer wheels removed.

In FIG. 16, there is shown an exploded rear view of the sets 54 mounted on the mixer 55. The same reference numerals are used in FIGS. 15 and 16 as those used in FIGS. 10 to 12 for those components that are identical. The same reference numerals are used in FIGS. 13, 14, 15 and 16 as those used in FIGS. 10 to 12 to refer to those components that are identical.

Figure 17:
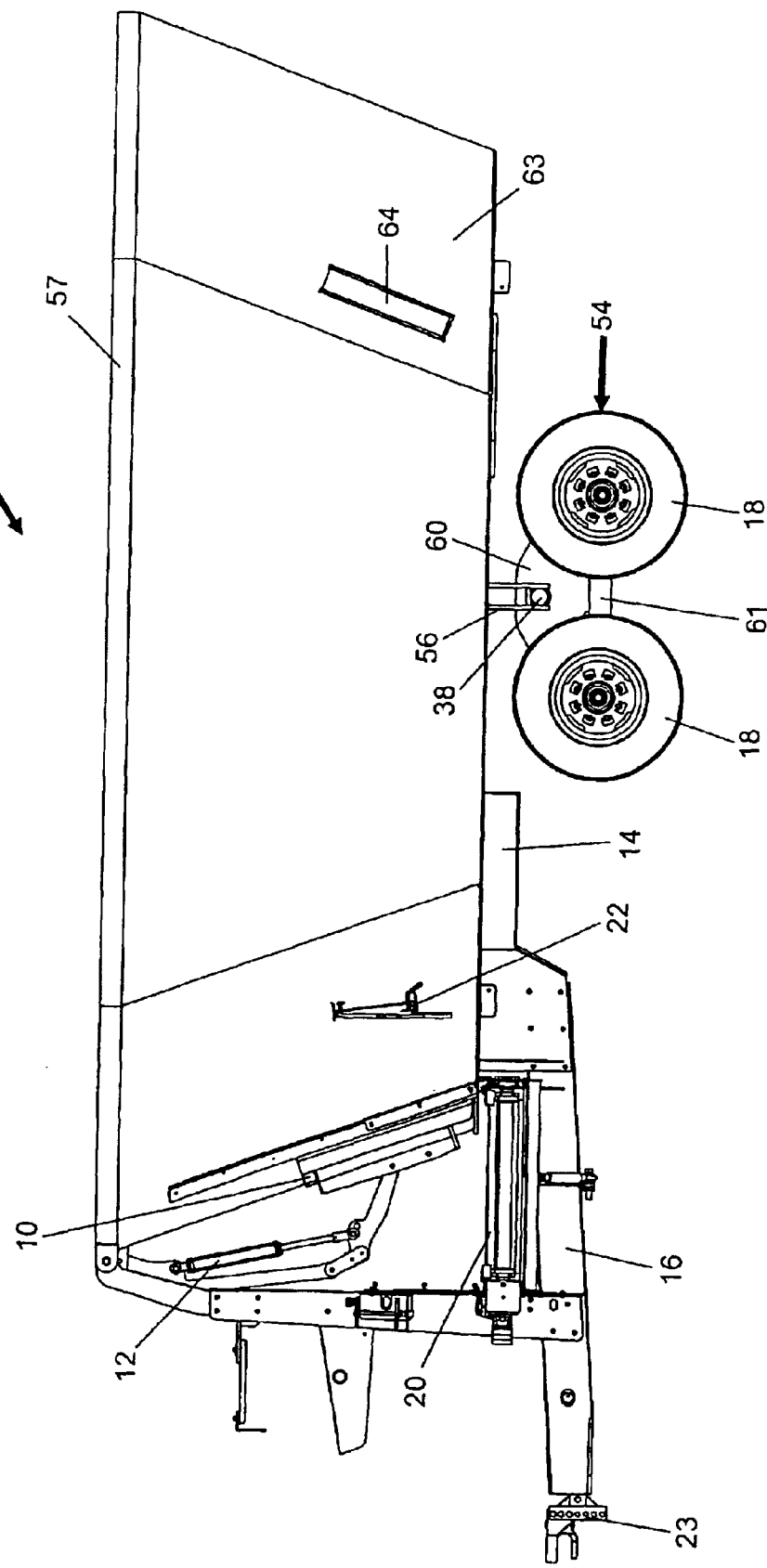
FIG. 17 is a side view of a double auger mixer.
Figure 18:
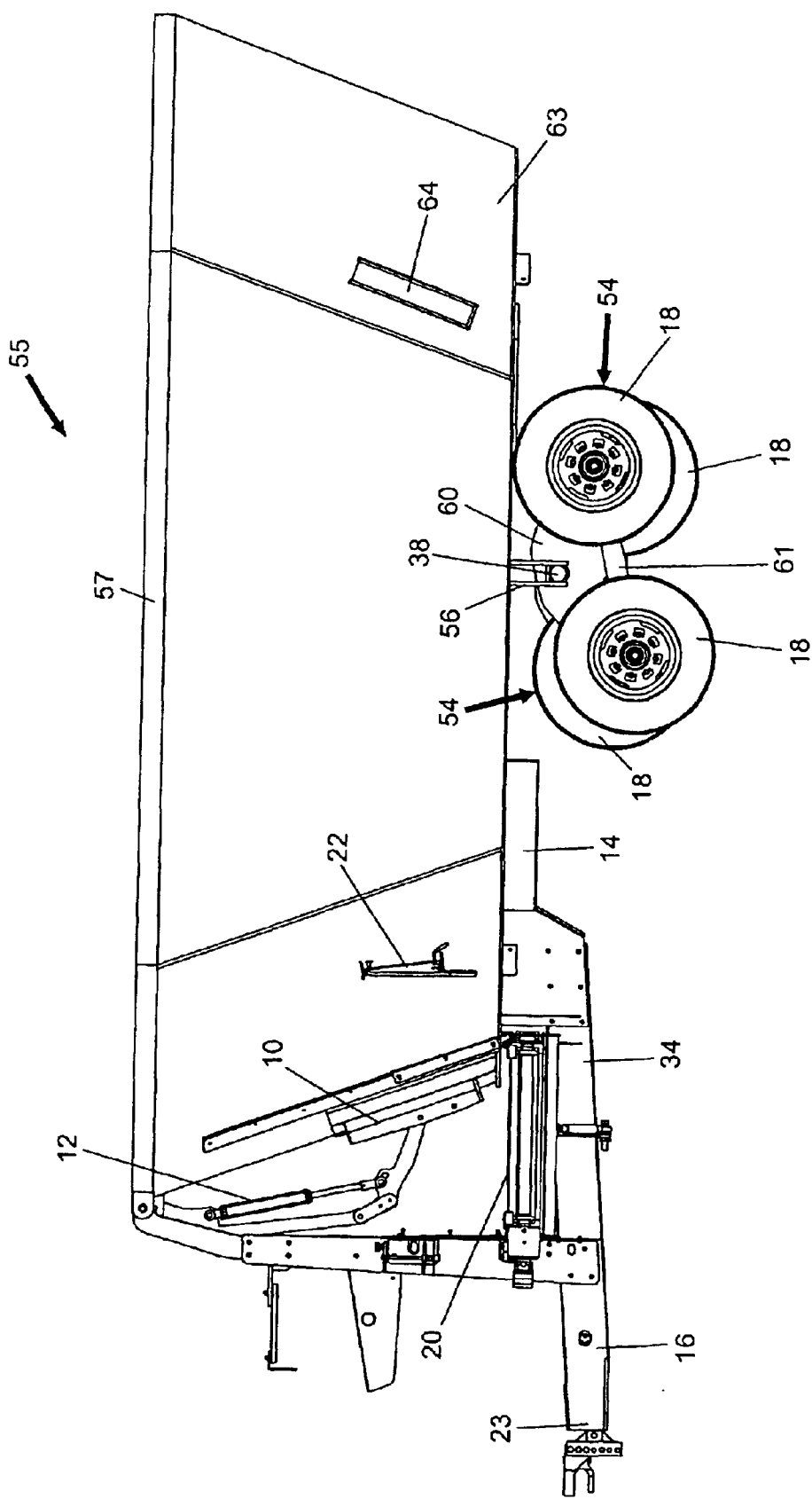
FIG. 18 is a side view of the double auger mixer of FIG. 16 with the wheels on one side tilted.

In FIG. 17, there is shown a side view of the mixer 55 being supported by sets 54 (only one of which is shown) of wheels 18. The mixer 55 has sloped side walls 62. A mixer 55 has a mixing chamber 57 with a sloped side wall 63. A window 64 in the side wall provides visual access to an interior of the mixing chamber 57 so that the degree of mixing can be observed from a side of the mixer. The mixer is supported by two sets 54 (only one of which is shown) of wheels 18. The wheels 18 are in a horizontal position. A support bracket 56 is affixed to an underside of the mixing chamber 57 and extends downward from either side of the mixer 55. A weight bar 38 is supported in each of two support brackets 56 (only one of which is shown). A pivot bracket 60 extends from front to rear in each of the sets 54 to allow the wheels of each set to pivot about the weight bar 38. The wheels 18 are in a horizontal position. In FIG. 18, there is shown a side view of the mixer 55 with the set 54 on the near side of the mixer 24 tilted and the set 54 on the far side of the mixer 24 in the horizontal position. The same reference numerals are used in FIGS. 17 and 18 as those used in FIGS. 3, 10 and 11 for those components that are identical.

While the mixers of the present invention can be used without weight bars, preferably, the pivot point at each set of wheels is a weight bar. When weight bars or their equivalent are not used, no signals will be sent to the display. A sleeve is rotatable about the weight bar so that each set of wheels pivots independently about the weight bar for that particular set. Since the weight bars are mounted at pivot points on the mixer and there is one on each side for each set of wheels and another weight bar mounted in the tongue 16, the weight bars can be used to determine the weight of the material being mixed. Preferably, the weight bars are connected to a display 66 mounted on the mixer to show the weight of material being mixed whenever the display is activated. The connections between the weight bars 53 and the display 66 are conventional and are not shown in the drawings. Alternatively, the signals from the weight bars to the display can be transmitted wirelessly. The vertical window 64 provides visual access to an interior of the mixing chamber 57 so that the degree of mixing can be observed. Preferably, the window is on the lower half of the side wall of the mixing chamber. While many materials are suitable, the window is preferably made from plexi-glass.

While it is preferred to use the mixer to mix animal feed, the mixer can be used to mix various materials. For example, the mixer can be used in composting or to produce biomass from organic materials. The mixer is particularly useful where it is desirable to break down one of the materials during the mixing process.

When the weight of materials in the mixer is displayed continuously during the filling of the mixer, the weight of each of the materials to be mixed can be accurately determined. This can be advantageous to enable the proportions of the various materials to be accurately determined. Further, subsequent batches can be mixed using approximately the same proportions. The adjustable wheel system of the present invention allows the mixer to be used on uneven terrain while reducing the risk that the mixer will tip over. When the mixer is in operation, it is desirable that the mixer be as close to vertical as reasonably possible. Each set of wheels is pivotable about the pivot point for that set. The weight bars are used as the pivot point on each side of the mixer.

I claim:

1. A vertical mixer comprising a mixing chamber containing a substantially vertical rotatable auger having a generally helical flight that is tapered to converge from bottom to top, said flight having a periphery, with power means to rotate said auger about a longitudinal centre axis, said chamber having at least one opening to receive and discharge materials to be mixed, said chamber having an underside with two sets of wheels thereon, there being one set of wheels at each side of said mixer, each set of wheels having at least two wheels therein, said at least two wheels being mounted so that said at least two wheels are adjustable relative to said chamber to cushion variations in the terrain supporting the mixer.

2. A vertical mixer is claimed in claim 1 wherein each set of wheels has a pivot point, each wheel of said at least two wheels of each set being adjustable by pivoting about said pivot point, said pivot point being located apart from a centre axis of each wheel.

3. A vertical mixer as claimed in claim 2 wherein the mixer has a tongue extending outward at a front thereof and has one weight bar being located in said tongue and one additional weight bar being located at each pivot point of each of said sets of wheels, the weight bars being constructed to simultaneously provide a signal to a display, the display setting out the weight of material within the mixer at any given time.

4. A vertical mixer as claimed in claim 2 wherein said mixer has a tongue extending outward at a front thereof and has one weight bar being located in said tongue, with two additional weight bars providing said pivot points for said two sets of wheels, there being one additional weight bar for each set, said weight bars being constructed to simultaneously provide a signal to a display, said display setting out the weight of materials within the mixer.

5. A vertical mixer as claimed in claim 4 wherein each set pivots around one of said additional weight bars.

6. A vertical mixer as claimed in claim 2 wherein said mixer has a frame with a tongue extending outwards from said frame.

7. A vertical mixer as claimed in claim 6 wherein said mixer has two wheels in each set, said two wheels being mounted side by side.

8. A vertical mixer as claimed in claim 7 wherein said two wheels of a set are mounted on an axle extending between said two wheels, said axle being mounted to pivot about said pivot point in a plane extending laterally through said mixer and parallel to said axle.

9. A vertical mixer as claimed in claim 8 wherein said plane extends through said axle and is substantially parallel to said longitudinal centre axis of said auger.

10. A vertical mixer as claim in claim 2 wherein said mixer has a tongue extending outward at a front thereof.

11. A vertical mixer as claimed in claim 2 wherein said at least two wheels of each set being four wheels, with a first wheel and second wheel of said four wheels being mounted in tandem and a third wheel and fourth wheel of said four wheels being mounted in tandem, said first and third wheels being mounted side by side, said second and fourth wheels being mounted side by side, said four wheels being mounted about said pivot point so that said four wheels can pivot in a plane extending from front to rear of said mixer parallel to a centre line of said mixer, said plane being substantially parallel to a longitudinal centre axis of said auger.

12. A vertical mixer as claimed in claim 11 wherein said first and third wheels move downwards as said second and fourth wheels move upwards and vice versa, the pivoting motion of the wheels of each set being independent from the pivoting motion of the other set.

13. A vertical mixer as claimed in claim 12 wherein the wheels of each set are in a fixed relationship relative to one another.

14. A vertical mixer as claimed in any one of claims 8, 11 or 13 wherein there is a weight bar mounted at the pivot point of each set, there being one weight bar for each set, said mixer having a tongue extending outwards from a front thereof, there being a weight bar mounted in said tongue, said weight bars being constructed to provide a signal to allow a weight of materials within the mixer to be determined at any given time.

15. A vertical mixer as claimed in any one of claims 8, 11 or 13 wherein a weight bar is located to provide said pivot point for each set, there being one weight bar for each set, there being one weight bar for each set, said mixer having a tongue extending outwards from a front thereof, there being a weight bar mounted in said tongue, said weight bars being constructed to provide a signal to a display to allow a weight of materials within the mixer to be determined at any given time.

16. A vertical mixer as claimed in any one of claims 8, 11 or 13 wherein there is a weight bar mounted at the pivot point of each set and said mixer has a tongue extending outwards from a front thereof, there being a weight bar mounted in said tongue, said weight bars being constructed to provide a signal to a display to allow a weight of materials within said mixer to be determined and displayed continuously.

17. A vertical mixer as claimed in any one of claims 8, 11 or 13 wherein there is a weight bar mounted at the pivot point of each set and said mixer has a tongue extending outwards from a front thereof, there being a weight bar mounted in said tongue, said weight bars being constructed to provide a signal to allow a weight of materials within said mixer to be determined continuously.

18. A vertical mixer as claimed in any one of claims 1, 2 or 3 wherein said mixing chamber has a floor and a side wall, said side wall having an opening therein that includes part of said floor, said opening being sized and located to be closed by a door, said door having a closed position and an open position, said door having a segment thereon that forms part of said floor when said door is in said closed position.

19. A vertical mixer as claimed in any one of claims 1, 2 or 3 wherein said mixing chamber has a side wall therein with at least one window extending at least partially between a top and bottom of said side wall to allow visual access to an interior of said chamber from outside said mixer.

20. A vertical mixer as claimed in any one of claims 1, 2 or 3 wherein said mixing chamber has a floor and a side wall, said side wall having an opening therein that includes part of said floor, said opening being sized and located to be closed by a door, said door having a closed position and an open position, said door having a segment thereon that forms part of said floor when said door is in said closed position, said side wall having at least one window extending at least partially between a top and bottom of said side wall to allow visual access to an interior of said chamber from outside said mixer.

21. A vertical mixer comprising a mixing chamber containing a substantially vertical rotatable auger having a generally helical flight that is tapered to converge from bottom to top, said flight having a periphery, with power means to rotate said auger about a longitudinal centre axis, said chamber having at least one opening to receive and discharge materials to be mixed, said chamber having an underside with two sets of wheels thereon, there being one set of wheels at each side of said mixer, there being a weight bar for each set of wheels, said weight bar being located to provide a pivot point for the wheels of that set, there being a third weight bar mounted at a front of said mixer, said weight bars being constructed to provide a signal from which the weight of materials in the mixer can be determined at any given time or on a continuous basis.

22. A method of constructing a vertical mixer with adjustable wheels by having one set of wheels on each side of said mixer, said method comprising locating one pivot point on each side of said mixer, said pivot point being generally centrally located relative to the wheels of each set, there being two pivot points and one pivot point of said two pivot points for each set.

23. A method as claimed in claim 22 including the steps of locating a weight bar on each set so that said weight bar forms said pivot point for each set, there being two weight bars, locating a third weight bar at a front of said mixer and constructing the weight bars to provide a signal to indicate the weight of material within the mixer at any given time or continuously.

* * * * *